(12) United States Patent
Molander et al.

(10) Patent No.: US 8,607,158 B2
(45) Date of Patent: Dec. 10, 2013

(54) CONTENT PRESENTATION IN REMOTE MONITORING SESSIONS FOR INFORMATION TECHNOLOGY SYSTEMS

(75) Inventors: Mark E. Molander, Cary, NC (US); Gregory B. Pruett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/964,546

(22) Filed: Dec. 9, 2010

(65) Prior Publication Data

US 2012/0151360 A1    Jun. 14, 2012

(51) Int. Cl.
    *G06F 3/048*    (2013.01)
(52) U.S. Cl.
    USPC ........... 715/804; 715/771; 715/778; 715/764; 715/781; 715/805
(58) Field of Classification Search
    USPC .................. 715/764, 771, 781, 778, 804–805
    See application file for complete search history.

(56) References Cited

U.S. PATENT DOCUMENTS

| | | | | |
|---|---|---|---|---|
| 5,670,993 | A * | 9/1997 | Greene et al. | 345/556 |
| 5,790,127 | A * | 8/1998 | Anderson et al. | 715/802 |
| 5,913,920 | A * | 6/1999 | Adams et al. | 709/204 |
| 6,271,839 | B1 * | 8/2001 | Mairs et al. | 715/807 |
| 6,437,803 | B1 * | 8/2002 | Panasyuk et al. | 715/733 |
| 6,505,239 | B1 * | 1/2003 | Kobata et al. | 709/208 |
| 6,664,969 | B1 * | 12/2003 | Emerson et al. | 345/544 |
| 6,806,885 | B1 * | 10/2004 | Piper et al. | 345/545 |
| 6,922,724 | B1 * | 7/2005 | Freeman et al. | 709/223 |
| 6,931,458 | B2 * | 8/2005 | Bolian et al. | 710/15 |
| 6,961,908 | B2 | 11/2005 | Phillips | |
| 6,964,006 | B2 | 11/2005 | Aoki et al. | |
| 7,079,642 | B2 | 7/2006 | Jerijian et al. | |
| 7,181,455 | B2 * | 2/2007 | Wookey et al. | 1/1 |
| 7,197,712 | B2 * | 3/2007 | Muehlhausen | 715/743 |
| 7,348,987 | B2 * | 3/2008 | Willis et al. | 345/545 |
| 7,523,196 | B2 * | 4/2009 | Dostert et al. | 709/224 |
| 7,533,189 | B2 * | 5/2009 | Mahajan et al. | 709/248 |
| 7,536,657 | B2 * | 5/2009 | Shimizu et al. | 715/864 |
| 7,757,004 | B2 * | 7/2010 | Mahajan et al. | 709/248 |
| 7,761,622 | B2 * | 7/2010 | Nguyen | 710/62 |
| 7,844,848 | B1 * | 11/2010 | Hobbs | 713/400 |

(Continued)

OTHER PUBLICATIONS

03AM Laboratories PL, "RemotelyAnywhere, Version 4.70," Remotely Anywhere, downloaded at http://www.remotelyanywhere.com/remotelyanywhere.pdf, 2002, pp. 1-250, Hungary.

(Continued)

*Primary Examiner* — Steven B Theriault
(74) *Attorney, Agent, or Firm* — Kenneth L. Sherman, Esq.; Michael Zarrabian, Esq.; Sherman & Zarrabian LLP

(57) ABSTRACT

Content presentation in remote sessions by reducing processing and communication bandwidth requirements for the remote sessions in an information technology environment. Content presentation includes maintaining a session window on an electronic display screen of a remote administration console for remotely monitoring a corresponding server system via a communication link, and monitoring a display status of the session window on the display screen. Based on the display status of the session window, a quantity of refresh information for the session window is selectively transmitted from a management server to the remote administration console over the communication link for display in the session window. The refresh information includes status information for the remotely monitored server system.

21 Claims, 4 Drawing Sheets

(56) References Cited

U.S. PATENT DOCUMENTS

| | | | |
|---|---|---|---|
| 7,890,570 B2 * | 2/2011 | Mazzaferri | 709/202 |
| 7,895,521 B2 * | 2/2011 | Bhogal et al. | 715/740 |
| 7,962,552 B2 * | 6/2011 | Clark et al. | 709/205 |
| 8,112,513 B2 * | 2/2012 | Margulis | 709/224 |
| 8,112,518 B2 | 2/2012 | Underhill | |
| 8,117,314 B2 * | 2/2012 | Croft et al. | 709/227 |
| 8,127,233 B2 * | 2/2012 | McDowell | 715/748 |
| 8,200,896 B2 * | 6/2012 | Schmieder et al. | 711/113 |
| 8,234,577 B1 * | 7/2012 | Hardebeck et al. | 715/751 |
| 8,254,704 B2 * | 8/2012 | Lu et al. | 382/232 |
| 8,255,536 B2 * | 8/2012 | Chen | 709/226 |
| 8,286,002 B2 * | 10/2012 | Kamat et al. | 713/192 |
| 8,307,290 B2 * | 11/2012 | Liu | 715/740 |
| 2004/0048233 A1 * | 3/2004 | Matthews et al. | 434/350 |
| 2004/0199698 A1 * | 10/2004 | Bolian et al. | 710/305 |
| 2004/0249885 A1 * | 12/2004 | Petropoulakis et al. | 709/204 |
| 2006/0089992 A1 * | 4/2006 | Blaho | 709/227 |
| 2006/0184349 A1 * | 8/2006 | Goud et al. | 703/24 |
| 2006/0230156 A1 * | 10/2006 | Shappir et al. | 709/227 |
| 2006/0282855 A1 * | 12/2006 | Margulis | 725/43 |
| 2009/0070404 A1 * | 3/2009 | Mazzaferri | 709/202 |
| 2009/0125838 A1 | 5/2009 | Bhogal et al. | |
| 2009/0235177 A1 | 9/2009 | Saul et al. | |
| 2009/0307428 A1 * | 12/2009 | Schmieder et al. | 711/118 |
| 2010/0050111 A1 | 2/2010 | Duffy | |
| 2010/0156913 A1 * | 6/2010 | Ortega et al. | 345/520 |
| 2010/0268762 A1 * | 10/2010 | Pahlavan et al. | 709/203 |
| 2010/0268813 A1 * | 10/2010 | Pahlavan et al. | 709/224 |
| 2010/0268828 A1 * | 10/2010 | Pahlavan et al. | 709/227 |
| 2010/0268940 A1 * | 10/2010 | Pahlavan et al. | 713/155 |
| 2010/0268941 A1 * | 10/2010 | Pahlavan et al. | 713/155 |
| 2010/0271479 A1 | 10/2010 | Heydlauf | |
| 2011/0047472 A1 | 2/2011 | West et al. | |
| 2012/0166957 A1 | 6/2012 | Cramer et al. | |
| 2012/0166958 A1 | 6/2012 | Cramer et al. | |
| 2012/0166991 A1 | 6/2012 | Cramer et al. | |
| 2012/0226742 A1 * | 9/2012 | Momchilov et al. | 709/203 |

OTHER PUBLICATIONS

VISIONAPP, "Visionapp Remote Desktop 2010 (vRD 2010)—Convenient System Management", Oct. 2009, pp. i-16, visionapp AG, Germany.

SOFTPEDIA, "Remote Desktop Management Solution for Professionals", May 27, 2010, pp. 1-3, softpedia.com, USA.

U.S. Non-Final Office Action for U.S. Appl. No. 12/976,882 mailed Oct. 12, 2012.

U.S. Final Office Action for U.S. Appl. No. 12/976,882 mailed Jan. 3, 2013.

U.S. Non-Final Office Action for U.S. Appl. No. 12/976,902 mailed Oct. 12, 2012.

U.S. Final Office Action for U.S. Appl. No. 12/976,902 mailed Jan. 4, 2013.

U.S. Non-Final Office Action for U.S. Appl. No. 12/976,915 mailed Oct. 24, 2012.

U.S. Final Office Action for U.S. Appl. No. 12/976,915 mailed Feb. 28, 2013.

U.S. Non-Final Office Action for U.S. Appl. No. 12/976,882 mailed May 21, 2013.

U.S. Non-Final Office Action for U.S. Appl. No. 12/976,915 mailed Aug. 20, 2013.

U.S. Non-Final Office Action for U.S. Appl. No. 12/976,902 mailed Octobber 1, 2013.

* cited by examiner

CONTENT PRESENTATION IN REMOTE MONITORING SESSIONS FOR INFORMATION TECHNOLOGY SYSTEMS

BACKGROUND OF THE INVENTION

1. Field of the Invention

The present invention relates generally to content presentation and in particular to content presentation using graphical user interfaces in an information technology environment.

2. Background Information

Remote control sessions typically comprise graphical user interfaces implemented on administration consoles for remotely monitoring and controlling server systems in information technology systems. Such graphical user interfaces include graphical elements that represent elements of the server systems being remotely controlled. A remote administration console can be used to remotely control multiple server systems, or multiple components of a server system. In one example, a remote administration console comprises a client computer system, and server system comprises one or more servers such as blade servers.

The processing and communication bandwidth required for supporting several simultaneous graphical remote control sessions on remote administration consoles negatively affects performance of a centralized management server (e.g., having a remote presence session concurrently open with every blade server in a chassis, or for every virtual machine on a blade server). Such a centralized management server may comprise an integrated management controller managing across multiple servers. Further, the servers may be running important applications, and with the industry trend of increasing optimizations via virtualization, servers have reduced capacity left to run overhead non-workload demands, such as graphical remote control session for system admin users monitoring and administering the servers.

In addition, graphical user interfaces are becoming more visually advanced. Users increasingly expect a rich graphical user interface (GUI) display which typically requires more computing resources from servers and network bandwidth to render remotely on remote administration consoles.

BRIEF SUMMARY OF THE INVENTION

Embodiments of the invention provide content presentation in remote monitoring sessions by reducing processing and communication bandwidth requirements for the remote sessions in an information technology environment comprising one or more information technology systems.

One embodiment of the invention comprises a method of content presentation, including maintaining a session window on an electronic display screen of a remote administration console for remotely monitoring a corresponding server system via a communication link, and monitoring a display status of the session window on the display screen. Based on the display status of the session window, selectively transmitting a quantity of refresh information for the session window from a management server to the remote administration console over the communication link for display in the session window, wherein the refresh information comprises status information for the remotely monitored server system.

In one embodiment, selectively transmitting a quantity of refresh information for the session window further includes transmitting a reduced quantity of refresh information for the session window from the management server to the remote administration console over the communication link for display in the session window, based on the display status of the session window.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
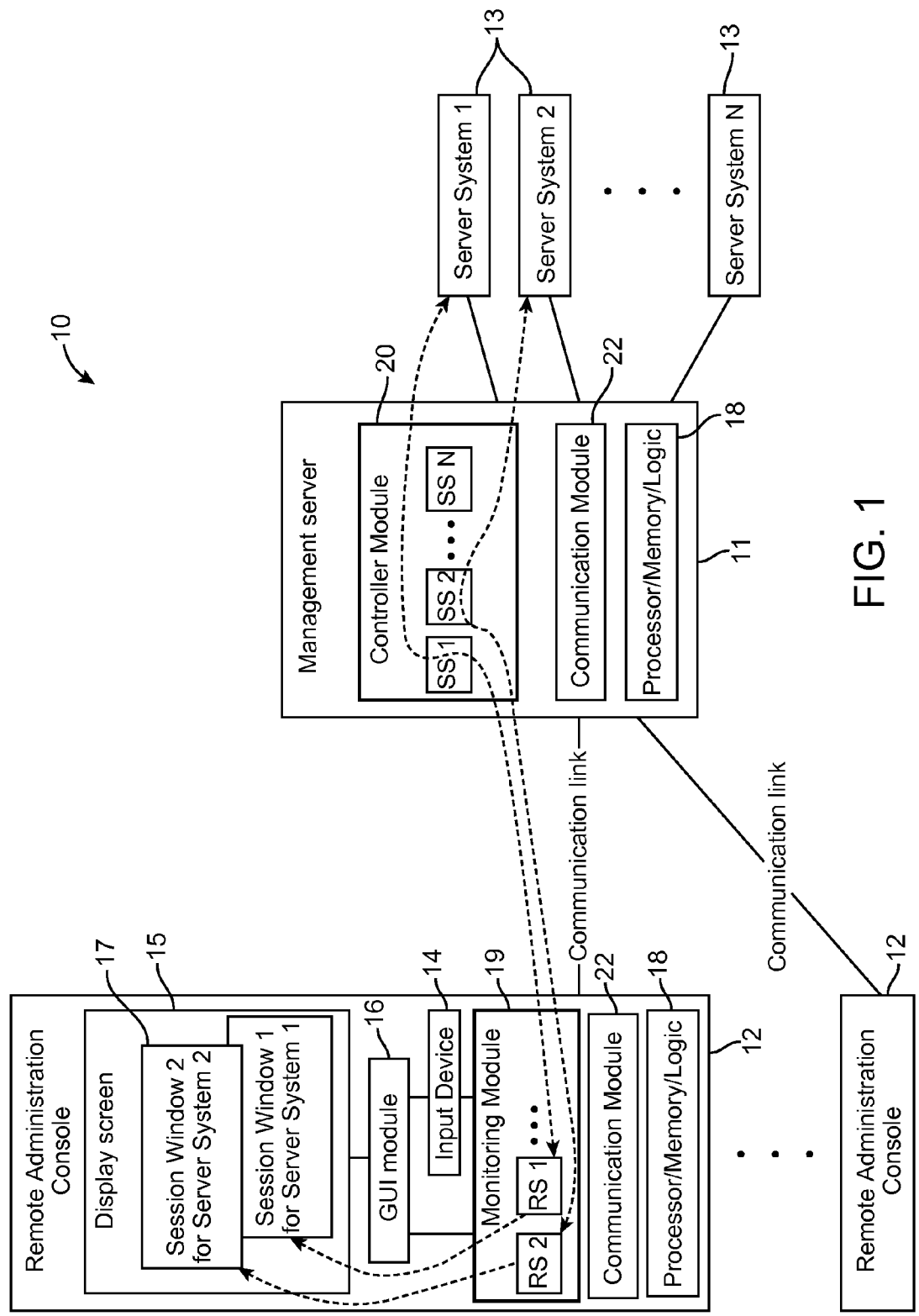
FIG. 1 illustrates a block diagram of a system for content presentation in remote sessions by reducing processing and communication bandwidth requirements for the remote sessions in information technology systems, according to one embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for content presentation, as well as operation and/or component parts thereof. While the following description will be described in terms of content presentation systems and processes for clarity and placing the invention in context, it should be kept in mind that the teachings herein may have broad application to all types of systems, devices and applications.

Embodiments of the invention provide content presentation in remote sessions for information technology systems, by reducing processing and communication bandwidth requirements for remote sessions in information technology (IT) systems. One embodiment of the invention comprises a method and system for reducing processing and communication bandwidth for remote sessions on one or more remote administration consoles, allowing multiple simultaneous remote sessions to be supported by a management server. In one implementation, several remote sessions are supported by a single management server which may be executing several virtual machines. Administrators can keep many remote administration console sessions open for remotely monitoring and/or controlling critical systems via the management server. Embodiments of the invention reduce performance impact on the management server, and reduce communication bandwidth requirements between the remote sessions and the management server.

In one embodiment of the invention, reducing processing and communication bandwidth required is accomplished by automatically monitoring active window coverage and transmitting remote session data only for the active windows. In one embodiment of the invention, bandwidth required for multiple remote sessions is reduced at an administrator end by only transmitting data for the remote sessions currently being viewed by the administrator. Specifically, in one embodiment, only data corresponding to a session window that is currently in focus or view is transmitted from a management server to each remote session via a communication link. The communication link may comprise wired/wireless communication channel, communication network, Internet, etc. The remote administration consoles and the management server are on logically separate networks.

Administration consoles typically execute remotely from the servers and systems that they are monitoring. For example, servers and other computing systems typically execute in a centralized data center, and the users who administer such systems typically do so remotely from their office or home via an administration console. Occasionally administration consoles are used from within the data center, which locationally may be considered "local" to the managed systems, but is still "remote" in the sense that an administration console is communicating the same way via an intermediary management server between the administration console and the servers being managed.

One embodiment of the present invention comprises a system implementing a method for reducing the bandwidth required for transmitting information from a management server to a remote session by continually monitoring whether a graphical user interface window at the remote session is active or is inactive (e.g., minimized or hidden). Another embodiment of the present invention comprises a system configured for reducing processing and the communication bandwidth required for updating multiple remote sessions at remote administration consoles, by only transmitting from the management server to the remote sessions, data for the remote sessions that are currently being viewed by an operator or administrator.

FIG. 1 shows a block diagram of an information technology system 10 according to an embodiment of the invention. The system 10 comprises a management server 11 and one or more remote administration consoles 12, wherein the management server 11 is configured for connection to each remote administration console 12 via a communication link. The management server 11 is connected to multiple server systems 13 to be monitored remotely (monitoring a server system may include also controlling the server system).

In one embodiment, a remote administration console 12 includes an input device 14, an electronic display screen 15, a GUI module 16 configured for controlling display of content elements including GUI elements such as windows on the display screen 15, a communication module 22 (such as a network interface module) configured for information communication over a communication link (e.g., network, channel, wireless link), a processing module 18 including processor, memory and logic, and a monitoring module 19 configured for managing at least one remote session RS on the remote administration console 12 for remotely monitoring one or more server systems 13 via the management server 11.

Users (operators) such as IT administrators utilize remote sessions RS in remote administration consoles 12 for remotely monitoring server systems 13 via the management server 11. A controller module 20 in the management server 11 enables reduced processing and communication bandwidth use between the remote administration consoles 12 and the management server 11, thereby enabling a greater number of active remote sessions RS at each remote administration console 12.

According to an embodiment of the invention, at each remote administration console 12, a user may utilize the input device 14 (e.g., a pointer such as a mouse or touch screen) to manipulate GUI elements on the display screen 15 as controlled by a GUI module 16. Such manipulation includes opening session windows 17 as active sessions, bringing a session window into active focus, taking a session window out of focus, moving session windows, hiding session windows, partially blocking a session window with other GUI elements, etc.

In one embodiment, a window is placed in focus and made active when a user uses a pointer (such as mouse pointer) to click on an area of the window to bring to the top of all other windows in the GUI environment of the display screen such that user input is routed to that window until another window (or GUI element) is placed in focus by the user. In another embodiment, the GUI module 16 automatically may place a window in focus to bring it to the attention of the user.

According to an embodiment of the invention, at each remote administration console 12, the monitoring module 19 maintains a remote session RS for each server system 13 that is remotely monitored by that remote administration console 12. As such, there is a remote session RS for each monitored server system 13. Each remote session RS has a corresponding GUI session window 17 that is associated with the corresponding monitored server system 13, wherein the session window 17 displays information about the monitored server system 13 on the display screen 15.

In one embodiment of the invention, a remote administration console 12 comprises a remote control client device, wherein said monitoring module 19 determines (monitors) display status of each session window on the display screen and monitors user interaction with each session window. Determining display status of a session window in the display screen comprises, for example, whether all or a portion of the session window is visible, whether the session window is entirely hidden or blocked from view, whether the session window is in focus, whether the session window is minimized, whether the session window is active or inactive, etc.

In one embodiment of the invention, the monitoring module 19 determines whether a particular server system session window 17 has focus and/or what portion of the session window 17 is visible on the display screen 15 of the remote administration console 12. If no portion of the session window 17 is visible on the display screen 15 (i.e., the session window is hidden), then the monitoring module 19 communicates that information to the controller module 20 of the management server 11. The controller module 20 maintains a server session SS for each connected server system 13 monitored. Each server session SS at the management server 11 for an associated server system 13 being remotely monitored, is associated with a corresponding remote session RS at a remote administration console 12.

In one embodiment of the invention, a server session SS comprises a module providing a session management process for maintaining status/control information for the corresponding server system 13. In one embodiment, a remote session RS comprises a module providing a session management process for keeping track of user activity and interaction with the remote administration console (such as with a corresponding remote session RS).

In one example, a session window 17 at a remote administration console 12 is hidden. In that case, reduced (or no) status/control refresh information for a corresponding monitored server system 13 is transmitted from the corresponding server session SS at the management server 11 to the associated remote session RS at the remote administration console 12. Any such transmitted information is displayed in the corresponding session window 17 on the display screen 15.

At the remote administration console 12, visibility of each session window 17 is continually monitored by monitoring module 19 (e.g., by a respective remote session RS), and if at least a portion of a session window 17 becomes visible to the user on the display screen 15, then the monitoring module 19 communicates that information to the controller module 20 of the management sever 11, wherein the management server 11 transmits further remote session information for the server system 13 to the remote administration console 12 for display 15. As such, in one embodiment of the invention, high-bandwidth data traffic only flows over a communication link from the management server 11 to a remote administration console 12 for the active session windows 17 being visible/viewed. The stipple arrows in FIG. 1 show an example of flow of information transfer in the system 10, according to an embodiment of the invention.

In one embodiment of the invention, the monitoring module 19 at the remote administration console 12 is configured to frequently refresh a session window 17 having active focus with full refresh information from the management server 11. Session windows 17 that do not have active focus, are refreshed less frequently and with less information (e.g., with lower color depth and resolution).

Figure 2:
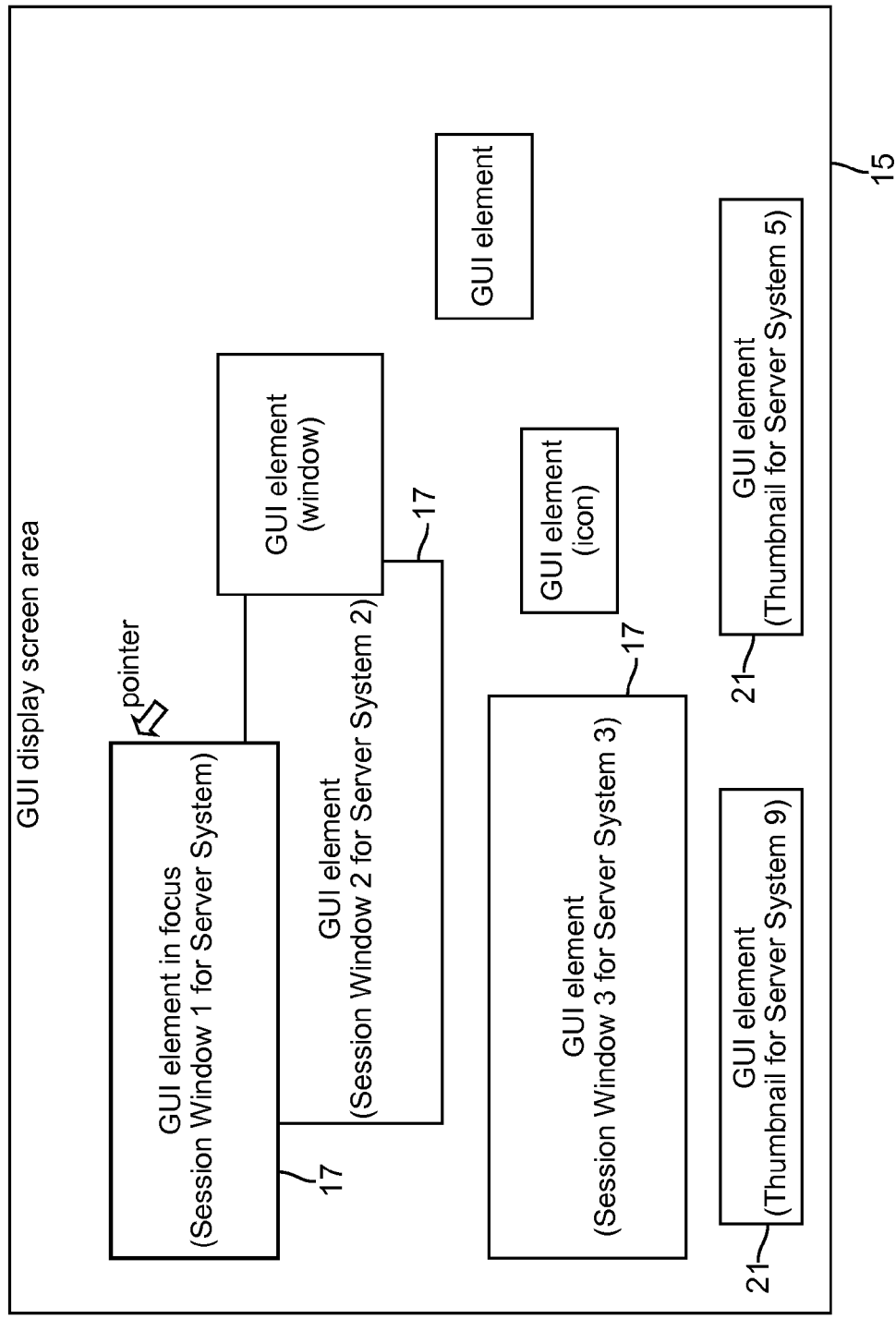
FIG. 2 illustrates a content presentation user interface including remote session windows, according to one embodiment of the invention.

An IT administrator may keep many active session windows 17 open (running) on a display screen of a remote administration console 12, as shown by example in FIG. 2, wherein only at least partially visible session windows 17 on the display screen 15 are updated with refresh information from the management server 11.

Figure 3:
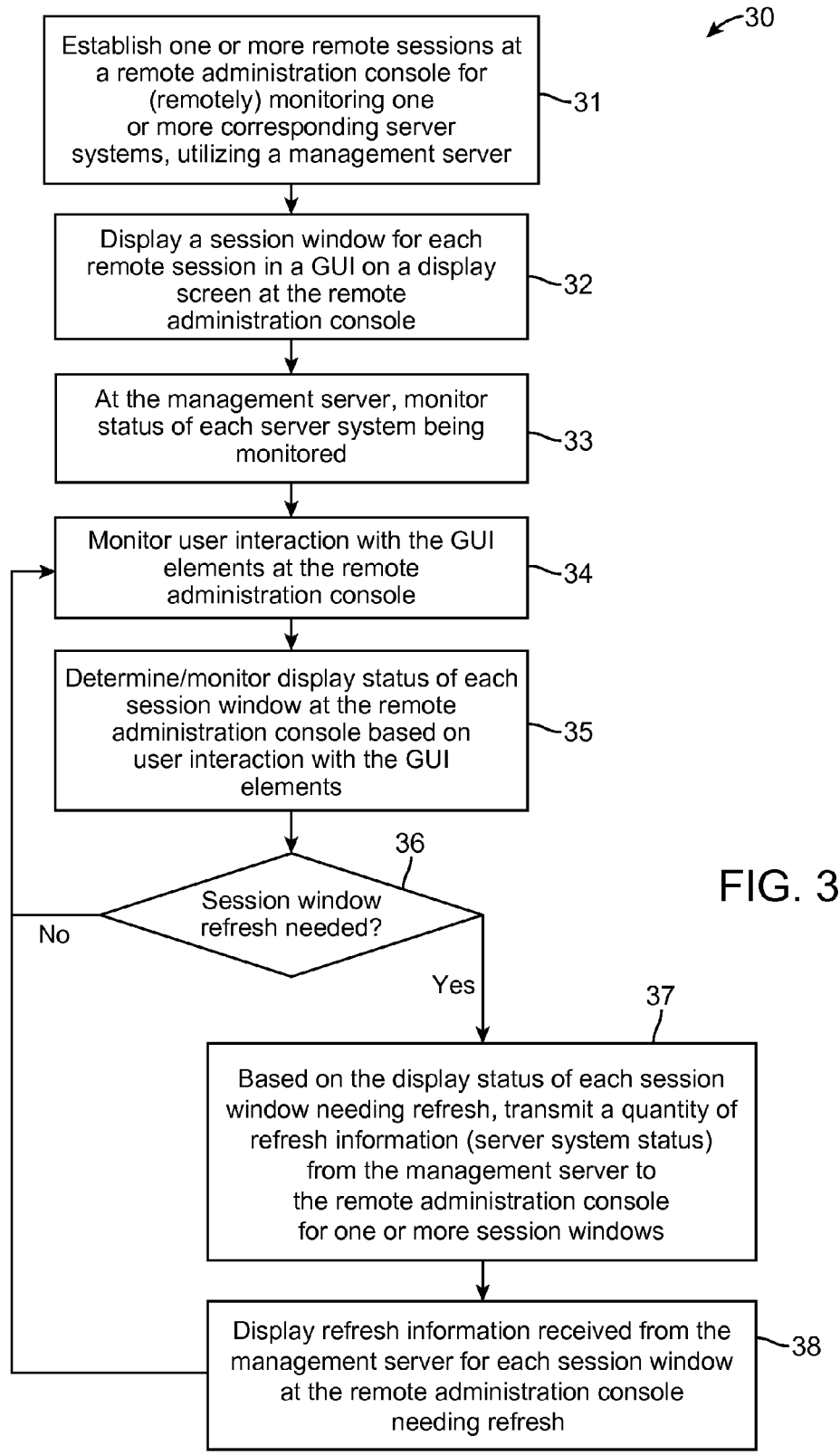
FIG. 3 illustrates a process flowchart for content presentation in remote sessions, by reducing processing and communication bandwidth requirements for the remote sessions in information technology systems, according to one embodiment of the invention.

FIG. 3 shows a flowchart of a process 30 for reducing processing and communication bandwidth for remote sessions in information technology systems, according to an embodiment of the invention. The process 30 comprises the following process blocks:

Block 31: Establish one or more remote sessions at a remote administration console for (remotely) monitoring one or more corresponding server systems, utilizing a management server.

Block 32: Display a session window for each remote session in a GUI on a display screen at the remote administration console.

Block 33: At the management server, determine status of each server system being monitored (e.g., remotely monitored).

Block 34: Monitor user interaction with the GUI elements at the remote administration console.

Block 35: Determine/monitor display status of each session window at the remote administration console based on user interaction with the GUI elements.

Block 36: Determine if a refresh is needed for one or more session windows based on the display status of each session window at the remote administration console. If a refresh is needed, then proceed to Block 37, otherwise proceed to Block 34.

Block 37: Based on the display status of each session window needing refresh, transmit a quantity of refresh information (server system status) from the management server to the remote administration console over the communication link for one or more session windows needing refresh.

Block 38: Display refresh information received from the management server for each session window needing refresh at the remote administration console.

The process Blocks 36 and 37 provide selectively transmitting a quantity of refresh information for the session window from a management server to the remote administration console over the communication link, based on the display status of the session window. According to an embodiment of the invention, Block 31 further comprises establishing one or more remote sessions at multiple remote administration consoles, wherein Blocks 32 through 37 are performed for each remote terminal. According to an embodiment of the invention, in Block 36, determining if a refresh is needed for a session window is based on the display status (e.g., visibility) of the corresponding session window at the remote administration console for the monitored server system, as described herein. According to an embodiment of the invention, in Block 37, the quantity of refresh information requested/received for each monitored server system is a function of the display status (e.g., visible portion, thumbnail) of the corresponding session window at the remote administration console for the monitored server system, in order to reduce quantity and/or frequency of such transmitted refresh information, as described herein.

According to an embodiment of the invention, when a session window 17 is not visible (e.g., blocked, minimized or on different viewing tabs), then reduced (or no) refresh information is transmitted from the management server 11 to the remote administration console 12 for such a session window 17.

According to an embodiment of the invention, reduced refresh information is transmitted from the management server 11 to the remote administration console 12 to be displayed on a thumbnail display area (thumbnail) 21 associated with a minimized session window on the display screen (FIG. 2). A thumbnail is a reduced version of a GUI element such as a window, wherein the thumbnail occupies a smaller area of the display screen than the GUI element itself and typically displays a subset of the information of the GUI element. A user interacts with the displayed GUI elements, wherein in one example, a GUI element may comprise a session window, other window, icon, thumbnail, etc. The user interacts with the GUI and may move a GUI element over a session window, partially or entirely blocking the session window. The user may also move a GUI element to partially or completely reveal a session window.

According to an embodiment of the invention, if a user minimizes a session window (or in a tabbed GUI, the user hides a tab on which a session window is displayed), then the monitoring module 19 detects such user action and determines the status of that session window for refreshing the session window information (e.g., reduced information is transmitted from the management server 11 to the remote administration console 12 for such a window).

According to an embodiment of the invention, user action in minimizing a session window 17 or closing the session window is detected by the monitoring module 19, which in turn triggers the management server 11 to not transmit refresh information for such window (or to only transmit reduced refresh information for a thumbnail representing such a minimized session widow).

According to an embodiment of the invention, if a user had first initiated a command to the management server 11 via a session window 17 in a remote administration console 12, before hiding a session window 17, the command still executes on the management server 11, however, refresh information for that session window 17 is not transmitted from the management server 11 to the remote administration console 12. Such a command may comprise a command to a server system 13 associated with the session window.

In one embodiment of the invention, the monitoring module 19 detects if a session window 17 is fully blocked by one or more other GUI elements such as another window. The monitoring module 19 tracks the Cartesian coordinates (x, y, and z) of the GUI elements, including the session windows, on the display screen 15. If a GUI element completely overlays a session window such that the session window is not visible on the display screen 15, then the monitoring module 19 does not request/receive refresh information from the management server 11 for the blocked session window.

In one embodiment of the invention, if a user desires a subset (or portion) of refresh information for a partially visible session window (e.g., for tracking a command to determine it completion at an Server system), the monitoring module 19 provides a user with such a selection option, wherein the monitoring module 19 requests/receives reduced refresh information from the management server 11 for that partially visible session window.

In one embodiment of the invention, the monitoring module 19 requests/receives refresh information from the management server 11, for only a visible portion of a session window on the display screen 15. By communicating the remote-side visible area (refresh or repaint area) of the session window to the management server 11, the management server 11 only transmits refresh information corresponding to the visible portion of the session window, thereby conserving computing and communication resources. For example, if 90% of a session window is blocked on the display screen 15 by other GUI elements, then only the 10% of the refresh information corresponding to the visible portion of the session window is transmitted from the management server 11 to the remote administration console 12 for display in the visible portion of the session window.

In one embodiment of the invention, wherein thumbnails 21 represent minimized session windows on the remote administration console display screen 15, the monitoring module 19 enables a user to monitor/control multiple server systems 13 using corresponding thumbnails, wherein the controller module 20 of the management server 11 transmits a subset of refresh information for each monitored server system 13 to the monitor module 19 for display in the respective thumbnails 21. In one example, the subset of refresh information comprises a transcoding of a full image to a thumbnail size (e.g., selecting every 10th pixel in each x and y direction in the full image to generate a thumbnail image). If the full image is sufficiently static, then refresh transmission rate may also be reduced (e.g., one refresh every few seconds).

Further, according to an embodiment of the invention, the refresh rate for a session window may be reduced based on its display status. For example, the refresh rate for a session window may be reduced when the session window is not in active focus (e.g., refresh every 250 msec if window is in active focus, refresh every few seconds if not in active focus), when the session window is partially covered (refresh every 1 second if window is not covered, refresh every 4 seconds if partially covered), or when the session window is minimized into a thumbnail.

Embodiments of the invention provide reduction in information processing and transmission functions of the management server for the remote sessions in the remote administration consoles. This reduces processing and communication bandwidth requirements for the management server, and the remote administration consoles. This conserves resources of the management server, which can be used for core functions such as processing workloads. As such, according to an embodiment of the invention, a central management server allows several active remote sessions at one or more remote administration consoles, with reduced performance impact or communication network bandwidth associated with transmitting refresh information from the central management server to the one or more remote administration console.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
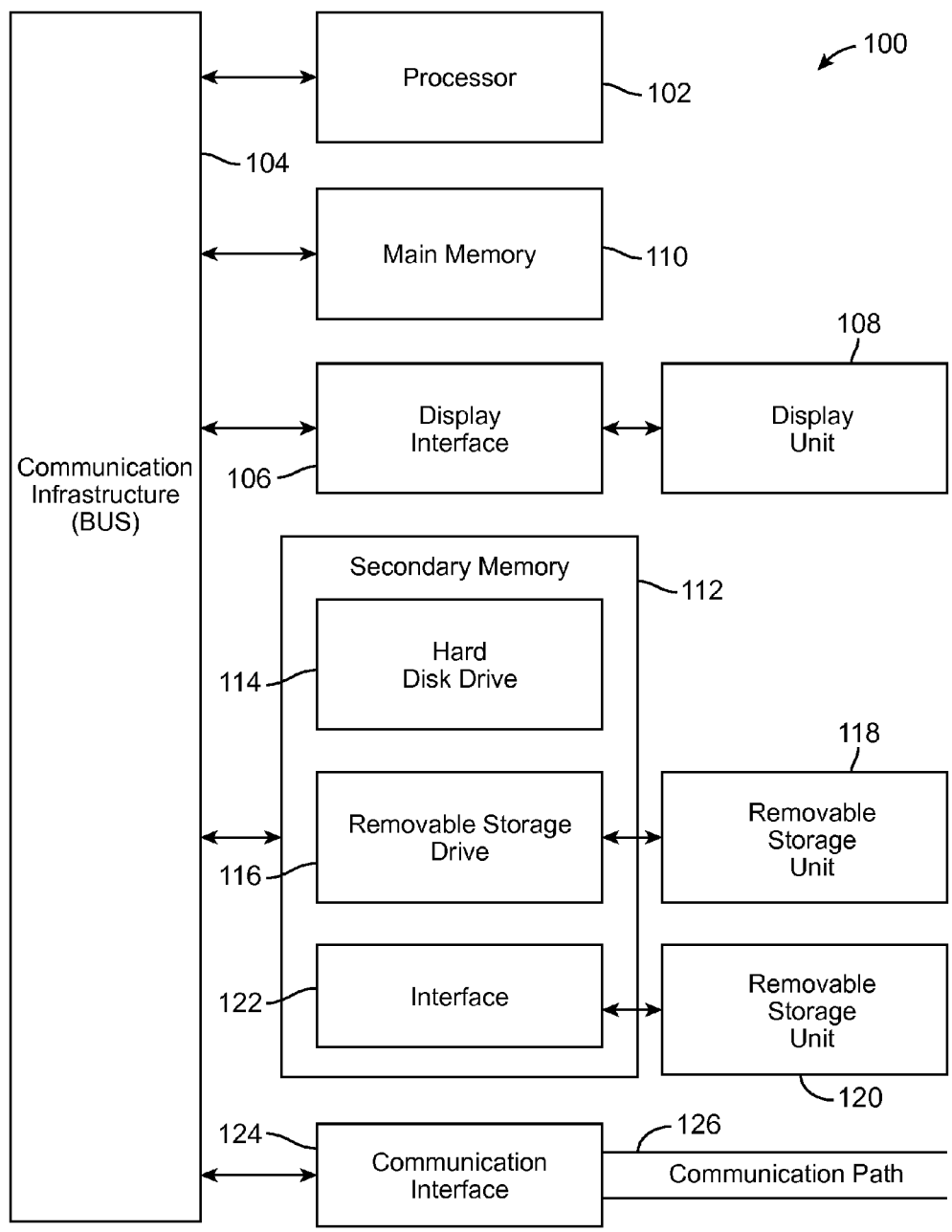
FIG. 4 illustrates a high level block diagram of an information processing system useful for implementing one embodiment of the invention.

FIG. 4 is a high level block diagram showing an information processing system 100 useful for implementing one embodiment of the present invention. The computer system 100 includes one or more processors, such as one or more processors 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of content presentation, comprising:
   maintaining a session window on an electronic display screen of a remote administration console for remotely monitoring a corresponding server system via a communication link;
   monitoring a display status of the session window on the display screen; and
   based on the display status of the session window selectively transmitting a quantity of refresh information for the session window from a management server to the remote administration console over the communication link for display in the session window, wherein monitoring the display status of the session window comprises determining one or more of: amount of visibility of the session window on the electronic display screen, focus status of the session window on the electronic display and active status of the session window, wherein the refresh information comprises status information for the remotely monitored server system.

2. The method of claim 1, wherein:
   selectively transmitting a quantity of refresh information for the session window further comprises transmitting a reduced quantity of refresh information for the session window from the management server to the remote administration console over the communication link for display in the session window, based on the visible area of the session window.

3. The method of claim 1, wherein selectively transmitting a quantity of refresh information for the session window further comprises:
   determining if a refresh of the session window is needed based on a percentage of area blocked of the session window; and
   if a refresh of the session window is needed, transmitting a quantity of refresh information from the management server to the remote administration console over the communication link based on percentage of area of the session window that is visible.

4. The method of claim 3, further comprising:
   determining a refresh rate for the session window based on active focus status or thumbnail state of the session window on the display screen.

5. The method of claim 1, further comprising:
   determining the quantity of the refresh information based on the amount of the session window that is blocked or covered.

6. The method of claim 5, wherein:
   the quantity of the refresh information for the session window comprises a subset of the status information for the monitored server system.

7. The method of claim 5, wherein:
   color depth and resolution information included in the refresh information for the session window is adjusted based on active focus status of the session window on the display screen.

8. The method of claim 1, further comprising:
   transmitting refresh information for the session window at a refresh rate that is based on the visibility status of the session window.

9. The method of claim 1, further comprising:
   establishing multiple remote sessions at the remote administration console for remotely monitoring multiple corresponding server systems via a communication link;
   displaying a remote session window on a display screen of the remote administration console for each remotely monitored server system;
   monitoring a display status of each remote session window on the display screen;
   monitoring interaction with each remote session window on the display screen; and
   for at least one remote session window, based on the display status of the at least one remote session window and interaction with the at least one remote session window, selectively transmitting a quantity of refresh information from a management server to the remote administration console over the communication link, wherein the refresh information comprises status information for a corresponding remotely monitored server system.

10. A system for content presentation on an electronic display in an information technology environment, comprising:
    a monitoring module configured for maintaining a session window on a display screen of a remote administration console for remotely monitoring a corresponding server system via a communication link, monitoring a display status of the session window on the display screen, and based on the display status of the session window selectively receiving a quantity of refresh information for the session window over the communication link, wherein the monitoring module determines the display status of the session window based on one or more of: amount of visibility of the session window on the display screen, focus status of the session window on the electronic display and active status of the session window, wherein the refresh information comprises status information for the remotely monitored server system.

11. The system of claim 10, further comprising:
    a management server configured for maintaining status information for each server system being remotely monitored, and providing refresh information for the session window over the communication link.

12. The system of claim 11, wherein:
    the monitoring module is further configured for determining if a refresh of the session window is needed based on a percentage of area blocked of the session window, and if a refresh of the session window is needed, then requesting transmission of a quantity of refresh information from the management server to the remote administration console over the communication link based on percentage of area of the session window that is visible.

13. The system of claim 12, wherein:
    selective refresh of the session window is based on a percentage of area blocked of the session window on the display screen.

14. The system of claim 12, wherein:
    the quantity of the refresh information for the session window comprises a subset of the status information for the monitored server system.

15. The system of claim 12, wherein:
    the quantity of the refresh information for the session window is based on a size of the session window that is blocked or covered on the display screen.

16. The system of claim 12, wherein:
the quantity of refresh information for the session window is refreshed at a rate that is based on active focus status or thumbnail state of the session window.

17. A computer program product for content presentation on an electronic display, comprising:
a computer usable medium having computer readable program code embodied therewith, wherein the computer readable program code when executed on a computer causes the computer to perform operations comprising:
maintaining a session window on a display screen of a remote administration console for remotely monitoring a corresponding server system via a communication link;
monitoring a display status of the session window on the display screen;
based on the display status of the session window selectively transmitting a reduced quantity of refresh information for the session window from a management server to the remote administration console over the communication link for display in the session window, wherein monitoring the display status of the session window comprises one or more of: amount of visibility of the session window on the display screen, focus status of the session window on the electronic display and active status of the session window, wherein the refresh information comprises status information for the remotely monitored server system; and
the management server maintaining status information for each server system being remotely monitored.

18. The computer program product of claim 17, wherein the program code further causes the computer to perform operations further comprising:
determining if a refresh of the session window is needed based on a percentage of area blocked of the session window; and
if a refresh of the session window is needed, transmitting a quantity of refresh information from the management server to the remote administration console over the communication link based on percentage of area of the session window that is visible.

19. The computer program product of claim 18, wherein the program code further causes the computer to perform operations further comprising:
determining a refresh rate for the session window based on active focus status or thumbnail state of the session window on the display screen; and
determining the quantity of the refresh information based on an amount of the session window that is blocked or uncovered, wherein the quantity of the refresh information for the session window comprises a subset of the status information for the monitored server system.

20. The computer program product of claim 19, wherein:
color depth or resolution information included in the refresh information for the session window is adjusted based on active focus status of the session window on the display screen.

21. The computer program product of claim 20, wherein the program code further causes the computer to perform operations further comprising:
transmitting refresh information for the session window at a refresh rate that is based on the visibility status of the session window.

* * * * *